(12) United States Patent
Schile

(10) Patent No.: US 6,491,845 B1
(45) Date of Patent: Dec. 10, 2002

(54) EPOXY HARDENER OF PHENOLIC OR 2° OH POLYOL AND METHYLOL POLYOL

(76) Inventor: Richard D. Schile, 22 Bloomer Rd., Ridgefield, CT (US) 06877

( * ) Notice: Subject to any disclaimer, the term of this patent is extended or adjusted under 35 U.S.C. 154(b) by 1 day.

(21) Appl. No.: 09/714,043

(22) Filed: Nov. 16, 2000

(51) Int. Cl.[7] .................. C08G 59/06; C08G 59/62; C08G 59/64
(52) U.S. Cl. .................. 252/182.24; 525/524; 525/486; 528/104; 528/110
(58) Field of Search .................. 525/486, 524; 252/182.24; 528/104, 110

(56) References Cited

U.S. PATENT DOCUMENTS

| | | | |
|---|---|---|---|
| 3,058,844 A | 10/1962 | Johnson et al. | 117/132 |
| 3,812,202 A | 5/1974 | Wright | |
| 3,954,762 A | 5/1976 | Helm | |
| 4,086,197 A | 4/1978 | Bouche et al. | |
| 4,197,389 A | 4/1980 | Becker et al. | 528/103 |
| 4,221,890 A | 9/1980 | Dimmick | 525/407 |
| 4,387,207 A | 6/1983 | Edwards | 528/86 |
| 4,866,133 A | 9/1989 | Andrews et al. | 525/109 |
| 4,916,187 A | 4/1990 | Goel | 525/109 |
| 5,107,046 A | 4/1992 | Nakajima et al. | 568/727 |
| 5,241,016 A | 8/1993 | Waddill et al. | 525/407 |
| 5,319,004 A | 6/1994 | Marten et al. | 523/404 |
| 5,422,415 A | 6/1995 | Michaelis | 528/86 |
| 5,428,082 A | 6/1995 | Gould et al. | 523/400 |
| 5,527,839 A | 6/1996 | Walker | 523/404 |
| 5,539,023 A | 7/1996 | Dreischhoff et al. | 523/404 |
| 5,587,409 A | 12/1996 | Drieschhoff et al. | 523/404 |
| 5,693,739 A | 12/1997 | McEntire et al. | 528/86 |
| 5,804,615 A | 9/1998 | Schreiber et al. | 523/414 |
| 5,916,933 A | 6/1999 | Johnson et al. | 523/208 |
| 5,945,500 A | 8/1999 | Durairaj et al. | 528/96 |
| 5,959,061 A | 9/1999 | Neumann et al. | 528/119 |
| 6,150,435 A | * 11/2000 | Bayer et al. | 523/434 |

FOREIGN PATENT DOCUMENTS

| | | | |
|---|---|---|---|
| CA | 2099230 A | * | 7/1993 |
| EP | 118270 A2 | * | 9/1984 |
| SU | 1645276 A | * | 4/1991 |

* cited by examiner

Primary Examiner—Robert E. L. Sellers
(74) Attorney, Agent, or Firm—Notaro & Michalos P.C.

(57) ABSTRACT

Hardeners for epoxy resins are disclosed which have the capability of curing at lower temperatures than currently available hardeners while retaining superior mechanical and thermal properties. These novel hardeners include a range of reactivity which results in a range of pot lives from minutes to months. These materials co-cure readily with polyamines and have little or no amine odor. Mixture viscosity can be controlled over a wide range independent of filler concentration which allows a broad range of applications from coating and casting to adhesives. Class I hardeners contain a mixture of polyols, polyamines and tertiary amines and cure at temperatures between 20–50° C., while class II hardeners have the same polyols mixed with one or more tertiary amines and cure between 65–100° C. Class III hardeners contain the same polyols combined with either imadazole or dicyandiamide, and optionally, a tertiary amine and cure at 120° C.

16 Claims, No Drawings

EPOXY HARDENER OF PHENOLIC OR 2° OH POLYOL AND METHYLOL POLYOL

FIELD AND BACKGROUND OF THE INVENTION

The present invention relates generally to the field of epoxy hardeners and in particular to new and useful groupings of epoxy hardener compositions which rapidly cure an epoxy over a range of temperatures.

There are two general types of polymers; thermoplastic and thermosetting. Thermoplastic polymers melt on heating and solidify on cooling. They can be remelted and resolidified repeatedly within limits. Thermoplastics are commonly molded by injecting a hot, molten thermoplastic into a cold steel die and removing the part from the mold as soon as the part has cooled enough to prevent distortion. The high melt viscosity of thermoplastic resins requires very high injection pressures, commonly 10,000–20,000 p.s.i. and above. These high injection pressures require enormous clamping forces to hold the two halves of the die together and so part size is limited by the clamping capacity of the molding machine. High capital investment and large production runs are characteristic of thermoplastic molding processes.

Thermosetting polymers do not melt on heating. They soften only and, if heated sufficiently will char. Thermosetting resins such as epoxies are molded by either injecting or placing by hand a prepolymer mixture consisting of epoxy resin, hardener, catalyst and various modifiers and fillers into a mold and heating for a time sufficient to complete the chemical reactions between the epoxy resin and the hardener, resulting in a thermosetting polymer having the shape and size of the mold. Molding times are considerably longer than for thermoplastic molding processes, typically five to fifteen minutes. However, injection pressures are low and so the mold clamping forces needed are also low. Thus, thermoset molding processes are characterized by low production rates and relatively low capital investment. But, large part sizes are possible.

The curing reactions of epoxies are exothermic and cure times and temperatures are determined by the heat transfer rate from the mold to the part and the scorch temperature of the epoxy. Epoxy/hardener systems which cure at low temperatures and which develop low exotherm as a result of chemical factors are very advantageous since they can be cured faster and will result in higher production rates.

Epoxies are used extensively as thermosetting adhesives for bonding wood, glass, ceramics and metals. For hand application, the epoxy resin and hardener are usually supplied in two separate syringes which have a common plunger. Pressing the plunger releases the correct proportions of epoxy and hardener. The two compounds are mixed with a spatula and applied to the bonding surfaces and then cured either at room temperature or at elevated temperature, depending on the application. Epoxy hardeners which cure rapidly at low temperature develop higher bond strength due to lower shrinkage stresses and permit higher production rates with lower energy expenditure.

Epoxy adhesives are frequently used in industrial processes in the form of "film adhesive". A prepolymer mixture of epoxy, hardener, and other desired components is applied as a coating onto a polymer film substrate, rolled up and stored in a freezer to stop the chemical reactions between components. When needed, the film adhesive is removed from the freezer and applied to a metal or composite part, the backing is stripped off and the assembly completed and cured in an oven or autoclave.

At the point when the adhesive is removed from the freezer, the epoxy mixture begins to cure slowly at room temperature. After a certain time called the "out time", the adhesive will become stiff and brittle and unusable. Latent mixtures having long out times are highly desirable in order to complete complex assemblies before curing.

Epoxies are combined with fiberglass or carbon fiber in the manufacture of composite materials. These are used extensively in military and aerospace applications, civil aircraft, sporting goods such as fishing rods, golf club shafts, tennis rackets, bows and arrows and the like. These are manufactured either by automated processes or by hand layup. Epoxies which develop excellent strength and toughness after curing at room temperature or low temperature result in composite structures having superior properties, higher production rates and lower cost. The absence of noxious vapors from the epoxy-hardener mixture is of great benefit to persons who must handle these materials.

Another application involving composites is the use of composite tooling for formed sheet metal parts. These are practical for prototyping and short production runs as a substitute for metal tools. The completed tool must be strong and hard and must cure effectively at room temperature.

Epoxies are used extensively in the "potting" of S electronic circuits which are exposed to shock, vibration, and rain, for example, for protection of the circuits. The circuit is assembled and placed in a case and the liquid epoxy mixture is poured into the case, thus enclosing the circuit components and isolating them from the atmosphere as well as protecting them from vibration and shock. These are used in automobile and truck engine computers, aircraft, tanks, missiles, etc. The epoxy mixture must have a low viscosity to fill the spaces around the components before hardening. A low cure temperature is desirable to protect is the electronic circuits from heat damage and to limit shrinkage which stresses components and connections. The cured epoxy must be strong and tough to resist mechanical stresses and the cure rate should be rapid to realize a high production rate.

Electronic components are "encapsulated" by dipping them into an epoxy prepolymer mixture, draining off the excess resin and curing the coating. This protects the components from atmospheric exposure. A high cure rate at low temperature is desired to prevent heat damage, keep stresses low and achieve a high production rate.

Coating systems have been developed which are used to protect metal surfaces from rust and corrosion and to enhance appearance. These are used extensively in large appliances such as washing machines, dryers, refrigerator cases, large structures such as bridge beams and architectural applications. While epoxies have enjoyed a long period of success in these applications, they have been recently partially replaced by the tougher polyurethanes. Polyurethanes have some disadvantages such as sensitivity to the resin/hardener ratio and the isocyanate resin is itself susceptible to degeneration from atmospheric moisture. Nevertheless, sophisticated metering and spraying equipment has been developed for these materials. Epoxy systems having superior strength and toughness after curing at low temperatures as well as relatively low sensitivity to the resin/hardener ratio and low toxicity may permit epoxy coating systems to regain some of their lost market share.

Prior art hardeners for epoxies are disclosed in art, such as in U.S. Pat. No. 3,812,202, which teaches a two part self-hardening epoxy composition which is formed by a phenol precursor combined with a methylol acrylic polymer.

The phenol precursor is made by combining bisphenol A with a polyepoxide compound to create a composition having two or more phenolic groups. The methylol acrylic polymer can be formed by polymerizing acrylamide or diacetone acrylamide with other ethylenically unsaturated monomers, followed by adding an aldehyde, such as formaldehyde, and optionally, a catalyst. The phenol precursor and methylol acrylic polymer are mixed to a desired viscosity, applied, and heated to at least about 300° F. to cure.

U.S. Pat. No. 4,866,133 discloses a curing agent for an epoxy containing a polymeric phenol and a polyamine. The curing agent is provided as a powdered latent curing agent mixed with a liquid epoxide resin. Polyamines used in the curing agent include diethylenetriamine and triethylenetetramine, among others. The polymeric phenols include different novolaks prepared from bisphenol A and formaldehyde, a novolak prepared from p-cresol and formaldehyde and a poly(p-vinylphenol), among others. The curing agent is activated by heating to at least about 60° C.

U.S. Pat. No. 5,107,036 teaches a curing agent for epoxy which is a combination of two phenol compounds. One phenol is a polyhydric phenol, formed from a condensation reaction of a phenol having at least one phenolic hydroxyl group with a hydroxybenzaldehyde compound. The hydroxybenzaldehyde used in the condensation reaction must have a hydroxyl group and an aldehyde group bonded to a benzene ring, which may be substituted with at least one other constituent. The other phenol is a dihydric phenol, such as catechol, resorcinol, and bisphenol A.

Mixtures of bisphenol A and an aliphatic polyamine are disclosed in U.S. Pat. No. 4,221,890. In one embodiment, butyl glycidylether is added to the mixture which may result in the conversion of some of the bisphenol A to a secondary polyol, as well as the formation of adducts of the polyamine with the monoepoxide. There is no appreciation for the exothermic nature of the reaction between bisphenol A and the polyamine. Further, there is no consideration of the use of methylol-functional hardeners for epoxy resins, either alone or in combination with other types of polyols.

Clearly, there are many uses for epoxies and epoxy systems, and so hardeners which can more rapidly cure epoxy without charring or resulting in unstable compositions are desirable and useful.

SUMMARY OF THE INVENTION

It is an object of the present invention to provide useful hardener compositions for epoxies which cure over a broad range of temperatures.

It is a further object of the invention to provide hardener compositions for epoxies which cure fully and more rapidly at lower temperatures than existing hardeners.

It is a further object of the invention to provide hardener compositions for epoxies which have longer periods of latency at room temperature while retaining the ability to cure at lower temperatures than existing hardeners.

It is a further object of the invention to provide hardener compositions for epoxies which develop lower exotherm during curing than existing hardeners.

It is a further object of the invention to provide hardener compositions for epoxies which can be used without yielding noxious or harmful fumes.

Accordingly, three classes of epoxy hardeners which have increasing cure temperatures are provided. The Class I epoxy hardeners cure at temperatures between 20–50° C., Class II hardeners cure between 65–100° C. and Class III hardeners cure at 120° C. Class I hardeners contain a mixture of polyols, polyamines and tertiary amines, while Class II hardeners have the same polyols mixed with one or more tertiary amines and Class III hardeners contain the same polyols combined with either imadazole or dicyandiamide and optionally, a tertiary amine.

Polyols which are used to form each of the different classes of epoxy hardeners are classed into two groups: group A consisting of polyols with phenolic hydroxy groups, secondary alcohols or combinations thereof, and group B consisting of polyols having methylol functional groups, secondary alcohols or combinations thereof. Epoxy hardener compositions according to the invention will contain one or more polyol from group A and one or more polyol from group B with the other elements required by the class of hardener being created.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which a preferred embodiment of the invention is set forth.

DESCRIPTION OF THE PREFERRED EMBODIMENTS

Definitions

In the description of the invention, the following standard notation and definitions are used.

The notation A.B means a mixture of A and B in 1:1 molar ratio and assumed to have intermolecular bonding forces which results in a particular physical form of the product such as a medium viscosity liquid or a low melting crystalline solid. These are also known as molecular complexes.

The notation xA.yB means a mixture of A and B in molar ratio x:y.

The notation A/B means an adduct or a product produced by the chemical reaction of A and B regardless whether the reaction is addition or condensation. The nature of the reaction will be understood by a reader having ordinary knowledge of chemistry.

The notation "phr" means parts per hundred resin.

Cure times are expressed as cure temperature in degrees Celsius over a time period as ° C./hour.

"Polyol" is defined as a material having at least two reactive groups consisting of phenol, methylol or secondary alcohol and combinations of these. The polyols used in the hardeners are defined more particularly below.

"Polyamine" is defined as an amine chosen from one of ethylenediamine, diethylenetriamine, triethylenetetramine and tetraethylenepentamine.

"Tertiary amine" is defined as a material having at least one tertiary nitrogen atom and may contain in addition, one or more reactive hydrogen atoms in the form of a phenol, secondary alcohol, secondary amine or primary amine. If there are no active hydrogens, the tertiary amine is an external plasticizer. If there are one or two active hydrogens, the tertiary amine is generally an internal plasticizer.

The following abbreviations are used to indicate the identified chemical composition:

| Abbreviation | Chemical |
| --- | --- |
| BDMA | dimethylbenzylamine |
| BGE | butylglycidylether |
| BHMC | 2,6-bis(hydroxymethyl)-p-cresol |
| BPA | bisphenol A |
| BPS | bisphenol S; 4,4'-sulfonyldiphenol |
| CAT | catechol or pyrocatechol |
| DELA | diethanolamine |
| DEAPA | N,N diethyl-3-aminopropylamine |
| DETA | diethylenetriamine |
| DIPA | diisopropanolamine |
| EDA | ethylenediamine |
| DGEBA | diglycidylether-bisphenol A |
| HQ | hydroquinone |
| Im | imidazole |
| PC | p-cresol |
| ROL | resorcinol |
| TDP | 4,4'-thiodiphenol |
| TETA | triethylenetetramine |
| TMG | tetramethylguanidine |
| TMP | trimethylolpropane |

Overview

Hardeners for epoxy resins are provided which have the capability of curing at lower temperatures and shorter times and with lower exotherm than existing hardeners. They are easily handled liquid materials having a range of viscosities thus allowing wide latitude in formulating. They are made from cheap and readily available industrial chemicals, have low odor, are easily handled and non-reactive when exposed to the atmosphere. Curing reactions with epoxy resins exhibit low exotherm and give cured products having low cure shrinkage, high tensile strength and high toughness.

Hardeners

The hardeners in accordance with the invention are broken down into three classes according to the temperature required to give complete curing: I) 20–50° C., II) 65–100° C. and III) 120° C.

Class I hardeners cure an epoxy, such as Shell EPON828 epoxy, at room temperature and give pot lives ranging from ¼ hour to 4 hours at 20° C. depending on the application, although at least one system according to the invention requires a 50° C. postcure for complete curing. The Class I hardeners consist of mixtures of various novel polyols mixed with polyamines and optionally, tertiary amines.

Class II hardeners consist of mixtures of these same polyols together with one or more tertiary amines. Mixtures of these materials with an epoxy provide all of the advantages cited above but give pot lives (latency) at room temperature ranging from 1–10 days yet most of these systems cure fully at 65° C.

Class III hardeners consist of the polyols combined together with either imidazole or dicyandiamide and, in some cases a tertiary amine. When imidazole is used, rapid curing systems are obtained which are suitable for reaction injection molding at 120° C. or, with a slight modification, thermoset injection molding. The systems based on dicyandiamide provide very long pot lives at room temperature (latency) while curing rapidly at 120° C. and are suitable for film adhesive applications.

Epoxy hardener compositions according to the invention contain one or more polyol from group A and one or more polyol from group B in addition to the other elements required by the class of hardener being created. The two groups of polyols preferred for use with the class I, II and III hardeners are set forth in the table below:

| Group A | Group B |
| --- | --- |
| bisphenols (ex. bisphenol A or thiodiphenol) | trimethylolpropane |
| dihydric phenols (ex. catechol or resorcinol) | adduct of trimethylolpropane with 1 mole of a monoglycidyl compound |
| adduct of a bisphenol with 1-2 moles of a monoglycidyl compound | adduct of a bisphenol with 2 moles of trimethylolpropane (ring substitution) |
| adduct of a dihydric phenol with 1–2 moles of a monoglycidyl compound | adduct of a dihydric phenol with 1–2 moles of trimethylolpropane (ring substitution) |
| adduct of a diglycidyl compound with 2 moles of a dihydric phenol | adduct of 0-cresyl glycidylether with 2 moles of trimethylolpropane (one ring substitution, one epoxy reaction) |
| adduct of trimethylolpropane with 2 moles of a monoglycidyl compound (remaining methylol is non-reactive with epoxy under normal curing conditions) | adduct formed by first reacting trimethylolpropane with 2 moles of 0-cresyl glycidylether (removes epoxy groups) followed by reacting additional 2 moles of trimethylolpropane (ring substitution) |
| adduct of a 4-alkyl phenol with 1 mole diethanolamine and one mole formaldehyde. | adduct of a diglycidyl compound with 2 moles of a monohydric phenol capable of ring substitution, followed by reaction with 2 moles of trimethylolpropane |
| adduct of a 4-alkyl phenol with 1 mole N,N(diethylamino)-3-propylamine and one mole formaldehyde. | adduct of a monoglycidyl compound with 1 mole of a monohydric phenol capable of ring substitution followed by reacting 1 mole of trimethylolpropane trihydric compound formed by reacting a 4-alkyl phenol with 2 moles of formaldehyde to produce methylol groups at the 2- and 6- positions. |

The group A compounds are also referred to herein as first polyols having phenolic hydroxy groups, secondary alcohols and combinations thereof. The group B compounds are also called second polyols having methylol functional groups, secondary alcohols and combinations thereof.

Although some of the compounds in the two groups A and B contain more than two hydroxyl groups, only two hydroxyl groups are reactive with an epoxy under the curing conditions for the hardener compositions, due to either steric effects or chelation. The last two items in group A are special items which contain only one active phenolic hydroxyl group, and they are included here for convenience.

The compounds in each list vary widely in viscosity and molecular weight, which provides for a broad range of hardener compositions in each class. Higher molecular weight polyols are effective tougheners for epoxies and are resinous solids or semi-solids of high viscosity, while lower molecular weight polyols are usually either low melting point crystalline solids or low to medium viscosity liquids. Both types of lower molecular weight polyols are effective reactive diluents for the higher weight polyols, which provides for control of the viscosity of the mixtures of polyols, polyamines and epoxy resin.

The polyamines used in the hardeners are selected from the group consisting of ethylenediamine, diethylenetriamine, triethylenetetramine and tetraethylenepentamine. Tertiary amines of the invention include materials having at least one tertiary nitrogen atom and many contain one or more reactive hydrogen atoms in the form of a phenol, secondary alcohol, secondary amine or primary amine. Tertiary amines without an active hydrogen are considered external plasticizers, while those with one or two active hydrogens are generally internal plasticizers.

Mixtures of the previously described polyamine or tertiary amine, Group A polyol and Group B polyol are generally easily handled, stable liquids which have all of the desirable characteristics previously described provided some simple rules for determining relative proportions are observed:

a) As a starting point, one molecule of polyamine or tertiary amine should be provided for each phenolic hydroxyl group.

b) No less than one molecule of polyamine or tertiary amine should be provided for each molecule of TMP or mono-substituted TMP.

c) One molecule of polyamine or tertiary amine should be provided for each secondary hydroxyl group.

Examples of the foregoing are as follows: BPA.2DETA, (BPA.2TMP).4DETA, (TMP/BGE).2DETA, and (ROL/2TMP).2DETA (the phenolic hydroxyl groups of ROL/2TMP are non-reactive with epoxy).

Moderate increases in the proportion of polyamine or tertiary amine do not result in major changes in cure rates or properties of the cured epoxy. For Class I hardeners, decreasing the proportion of polyamine may result in incomplete curing for some systems. If the concentration of polyamine is reduced to the 50% stoichiometric level, addition of an effective tertiary amine may be required to achieve satisfactory room temperature cures.

The relative proportions of Group A and Group B polyols influence the cure rate and the mechanical properties of the cured epoxy. The high molecular weight polyols in these groups should be used at concentrations of at least 5–10 phr in order to achieve significant improvements in strength and toughness. The lower molecular weight polyols are used as reactive diluents to control mixture viscosity as well as to provide low viscosity mixtures for casting and potting applications when used as the sole polyol component. In general, the higher molecular weight polyols cure more slowly than those of low molecular weight. Cure rate is also influenced by the nature of the hydroxyl groups. Cure rate decreases in the order; phenolic hydroxyl>methylol>secondary alcohol.

Determination of the theoretical hardener concentration in the epoxy (phr) is a relatively simple procedure. First, the total molecular weight of the hardener complex is determined. Second, the total number of functional groups (n) is added up. All of the polyols with the exception of items 7 and 8 of Group A are effectively difunctional. Third, the total molecular weight is divided by the total number of functional groups which is then divided by the epoxy equivalent weight which for EPON828 epoxy is 190. The result, when multiplied by 100 gives the hardener concentration in phr. As an example, consider BPA.2TMP.4DETA:

m.w. = 228.29 + 2 × 134.18 + 4 × 103.17 = 909.33;
n = 2 + 2 × 2 + 4 × 5 = 26; and
phr = 18.4.

This value should be considered a theoretical minimum concentration.

Optimum mechanical properties will be obtained when the theoretical minimum is increased by a factor which can range from 1.2 to greater than 2.0. This forces the polyamine to assume a lower functionality than the theoretical value and results in a more flexible structure with greater opportunities for hydrogen bonding. The ultimate glass transition temperature of the cured polymer will also be reduced. As a general principle, the best mechanical properties will be obtained when the glass transition temperature actually obtained by the selected cure schedule is close to the ultimate glass transition temperature (that obtained by curing at elevated temperature for an extended time). It is generally agreed that glass transition temperatures are limited to about 45° C. above the cure temperature.

The optimum hardener concentration should be determined by testing. The mechanical properties of the cured epoxy are remarkably insensitive to excessive hardener concentrations. In tests where 2½ to 3 times the theoretical hardener concentration was used, unreacted hardener was exuded from the cured epoxy, appearing as a tacky, resinous surface film which could be easily removed by wiping with a damp cloth, while the strength and toughness of the cured epoxy were still quite good.

When a polyamine or tertiary amine is combined with a polyol under appropriate conditions, an exothermic reaction occurs with the formation of a molecular complex. The mount of heat released decreases in the order phenolic hydroxyl>methylol>secondary alcohol. When the complex is subsequently combined with an epoxy resin, a rapid reaction occurs which involves the decomposition of the complex, mutual catalysis of the reactions between the epoxy and amine and also between the epoxy and the polyol and release of heat as a result of these epoxy reactions. Some of this heat is absorbed by the decomposition of the complex, resulting in a lower overall exotherm and a rapid cure without "runaway exotherm", which can result in foaming, vapor evolution and even charring in conventional epoxy hardener systems.

A brief discussion of the chemicals and reactions involved with the formation of the epoxy hardener compositions of the invention follows.

Trimethylolpropane (TMP) used in the epoxy hardeners is a cheap, non-toxic, low melting point crystalline solid which is incompatible with diglycidylether of bisphenol A (DGEBA). TMP is presently used as a hardener for flexible polyurethanes. Clear solutions with DGEBA may be obtained by heating the mixture above the melting point of TMP, but the mixture becomes milky on cooling to room temperature and gross phase separation occurs on standing. TMP is unreactive with epoxy absent a suitable catalyst.

However, if a tertiary amine is added to the mixture at a temperature between 50–90° C., the mixture clears rapidly and cures to a clear, colorless solid having a low glass transition temperature of about 90° C., depending on the concentration of TMP. Testing indicates that only two of the three methylol groups are reactive with epoxy, probably due to the formation of a strongly bonded chelate structure between the remaining methylol and either of the two adjacent ether groups. Other experiments have shown that very high glass transitions can be achieved by curing at 120° C. in the presence of a good catalyst such as imidazole, but the cured material is very hard and brittle.

TMP is also reactive with phenyl ring hydrogen, given a suitable catalyst, either acid or base. This reaction is relatively slow compared to the reaction of TMP with epoxy groups and occurs at a higher temperature. These two reactions of TMP allow the preparation of the long chain polyols in group B which have unique properties as epoxy hardeners/tougheners leading to excellent strength and toughness of the cured epoxy, while providing rapid rates of curing at low temperatures.

Polyamines and tertiary amines form complexes with phenolic hydroxyls, methylols and secondary alcohols, the bond strength and degree of exotherm resulting from these reactions decreasing in the order phenolic hydroxyl>methylol>secondary alcohol. When the polyol contains more than one type of hydroxyl group, rapid and complete reaction between the epoxy and the polyol can be assured if the hydroxyl group which forms the strongest intermolecular bond with the amine is placed at the ends of the polyol, thus ensuring that the polyamine or tertiary amine will be located at the same positions. For example, a polyol containing two terminal methylol groups and one or more interior secondary alcohols will react first at the terminal groups and secondarily at the interior hydroxyl groups only if there are available epoxy groups remaining and the structure has not become too rigid at the selected cure temperature. If a sufficiently high concentration of polyol containing internal secondary hydroxyl groups is used, these internal groups will not react with the epoxy.

Methylols and secondary alcohols are latent with epoxy resins in the absence of a suitable catalyst. Extended latency at room temperature is a highly desirable property for many applications, such as adhesive bonding, casting and potting. Using methylols and secondary alcohols together with a latent catalyst, such as a blocked tertiary amine or an insoluble amine which dissolves at the cure temperature, useful latent formulations can be obtained.

Bisphenol A is not latent with epoxy resins but it is readily converted to a latent form by reacting it with two moles of TMP via ring substitution in the 2- and 2'-positions. For example, a mixture of Shell EPON828 epoxy and the adduct of bisphenol A with two moles of TMP was heated to 100° C. for 24 hours with no detectable increase in viscosity. Similarly, resorcinol can be converted to a latent form by reacting it with two moles of TMP via ring substitution primarily in the 4- and 6-positions. This material is also a good solvent for dicyandiamide as well as other polar materials.

EXAMPLES

The following examples illustrate the preparation and use of the novel polyols for each class of hardener.

Example I.1

Preparation of TMP/BGE 6.42 g TMP, 6.80 g BGE (epoxy equivalent weight 140) and 0.26 g BDMA (2 pph) were loaded into a 250 ml boiling flask together with a magnetic stir bar and a water condenser was attached. The flask was placed in a heating mantle and the assembly placed on a stir plate. The mantle was heated by means of a variable transformer set at 30%. After heating for 20 min., the temperature was 150° C. The product was a medium amber liquid. The BDMA catalyst remained as part of the product.

Example I.2

Preparation of BPA.2TMP 6.50 g BPA and 8.03 g TMP (5% excess) were placed in a 100 ml beaker with a magnetic stir bar and the beaker was placed on a stirring hot plate at a surface temperature of 150° C. After 15 minutes, BPA was entirely dissolved at a temperature of 127° C. The product was a colorless, medium viscosity liquid which crystallizes slowly over a period of several days if left undisturbed.

Example I.3

Preparation of BPA.2TMP.2DETA

BPA.2TMP produced as above was warmed in a beaker on a stirring hot plate and the theoretical weight of DETA was added slowly with stirring. The product was a nearly colorless, medium-low viscosity liquid having almost no amine odor (warm).

Example I.4

Preparation of ROL/2TMP 5.01 g ROL and 12.22 g TMP were placed in a 250 ml boiling flask together with a magnetic stir bar, a water condenser was attached and the flask was placed in a heating mantle powered by a variable voltage supply. The assembly was placed on a stir plate and heated. A clear solution was obtained after 35 min. when 0.17 g (1 pph) TMG (a strong base) was added. The temperature was 95° C. and the liquid had a greenish tint. After 1 hour and 10 minutes and a maximum temperature of 111° C., the product was a deep blue, resinous liquid. The dried product contains 1 pph TMG.

Example I.5

Preparation of DGEBA/2CAT 3 g EPON828 epoxy and 1.75 g catechol were placed in a 50 ml beaker and placed on a hot plate at a surface temperature of 90–95° C. A clear solution was obtained in 5 minutes. After one hour, 0.5 pph TMG was added and heating continued for 30 minutes more. The product was a colorless, resinous semi-solid.

Example I.6

Test Sample

The following were mixed in sequence:
1. 5 g EPON828 epoxy
2. 10 phr TMP/BGE
3. 10 phr DETA After curing for 69 days at temperatures ranging from 20°–30° C., the Tg as measured by thermomechanical analysis was 72° C. After a 50° C./30 minute postcure, the $Tg_g$ increased to 780° C.

Example I.7

Test Sample 5 g EPON828 epoxy was mixed with 30 phr BPA.2TMP.2DETA. After curing 2 hours/30° C. followed by 2 days/20° C., the $Tg_g$ was 60° C. After a 50° C./30 minute postcure, the $Tg_g$ increased to 79° C. An additional 120° C./10 minute postcure, further increased the $Tg_g$ to 85° C.

Example I.8

Test Sample 3.6 g EPON828 epoxy was mixed with 30 phr BPA.2TMP.4DETA. After curing for 30° C./3 hours and 12

Example I.9

Test Sample 40 phr (EPON828 epoxy/2 CAT).2 (TMP/BGE).4DETA was mixed with 5 g EPON828 epoxy and cured at 30° C. for 2½ hours followed by 2 days at room temperature. The cured material was very strong and flexible and had a Tg of 69° C.

Example I.10

Test Sample 5 g EPON828 epoxy was mixed with 20 phr BPA.2(TMP/BGE) and 10 phr DETA. The hardener components were blended before addition to the epoxy resin. After curing for 1 hour at 30° C., the mixture had set to a tacky solid, dentable with a spatula. After curing for 71 days at room temperature, the $Tg_g$ was found to be 75° C. On postcuring at 50° C. for M hour, the $Tg_g$ increased to 83° C.

Example I.11

Test Sample 5 g EPON828 epoxy was blended with a mixture of 10 phr TMP/BGE and 10 phr DETA. After curing for 1 hour at 30° C., the mixture was a tacky semi-solid. After curing for 71 days at room temperature, the $Tg_g$ was found to be 72° C. on postcuring at 50° C. for ½ hour, the $Tg_g$ increased to 78° C.

Example 1.12

Test Sample 5 g EPON828 epoxy was blended with 40 phr of the mixture (DGEBA/2CAT).2 (TMP/BGE).4DETA. A straightforward conversion from molar ratios to weight ratios gives 15.4 phr DGEBA/2CAT, 14.0 phr TMP/BGE and 10.6 phr DETA. After heating for 1 hour at 30° C. the mixture was a tacky, dentable solid. After 2 days at room temperature, the $Tg_g$ was 69° C. The cured sample was strong and tough.

Example I.13

Preparation of CAT/BGE 8.04 g butyl glycidylether (epoxy equivalent weight 137) and 6.43 g catechol were loaded into a 250 ml boiling flask equipped with a water condenser and a stir bar. This mixture was heated to 63° C. at which point 1 pph TMG (tetramethylguanidine) was added and heating continued. This was heated to a maximum temperature of 110° C. with stirring over a period of one hour. The product was a dark amber liquid containing 1 pph TMG.

Example I.14

Test Sample

For this hardener, a composition equal to that of Example I.11 was combined with 10 phr 2CGE/3TMP. After curing for 1 hour at 30° C., the mixture was a tacky semi-solid. After 7½ hours at 30° C. the sample was hard and tack-free. After an additional 6 days at room temperature, the $Tg_g$ was found to be 68° C. After postcuring at 65° C. for 1 hour, the $Tg_g$ increased to 80° C.

Example I.15

Test Sample

This sample contained the same hardener composition as Example I.11 except that 10 phr DETA was replaced by 7.2 phr EDA (ethylenediamine). As with all similar hardener compositions, the hardener mixture was essentially odorless. After processing at the same 30°/20° C. cure schedule as Example I.14, the $Tg_g$ was found to be 66° C. After postcuring at 65° C. for 1 hour, the $Tg_g$ increased to 75° C. The cure rate was practically identical to that of Example I.14.

Example I.16

Test Sample 5 g EPON828 epoxy was blended with 27 phr (ROL/2TMP).2TMP.4DETA. The equivalent concentrations by weight were 9.0 phr ROL/2TMP, 7.1 phr TMP and 10.9 phr DETA. After curing for 1 hour at 30° C., the sample was a tacky, dentable solid. After curing for an additional 71 days at room temperature, the $Tg_g$ was 84° C.

Example I.17

Test Sample 5 g EPON828 epoxy was blended with 28 phr (CAT/BGE).2DETA and cured at 30° C. After 45 minutes, the sample was a tacky semi-solid. After 65 days at room temperature, the $Tg_g$ was found to be 78° C. The cured sample was strong and tough which appears to be typical of samples containing CAT/BGE despite the small size of this molecule.

Example I.18

Test Sample 5 g EPON828 epoxy were blended with a mixture of 5 phr CAT/BGE and 14 phr DETA. The cure rate at 30° C. was about the same as the previous sample. After curing at room temperature for 65 days, the sample was very strong and tough and gave a $Tg_g$ of 86° C.

Example I.19

Preparation of 2TMP/CGE 0-cresyl glycidylether is marketed commercially in a technical grade containing 90% CGE. The balance is assumed to be the adduct of CGE with o-cresol. To prepare 2TMP/CGE, the epoxy-functional component is first reacted with one mole TMP, using a basic catalyst such as BDMA or TMG. Each of the cresyl groups is then reacted with one mole TMP (ring substitution) which requires one mole TMP for 90% of the product and two moles TMP for 10% of the product. To minimize oligomer formation, all of the TMP is added at the beginning. A catalyst concentration of 1 pph and 4 hours at 130° C. were sufficient to complete the reactions. The product is a pale amber, viscous liquid.

Example II.1

Test Sample 5 g EPON828 epoxy was mixed with 10 phr BHM-C.TMG. The mixture remained flexible and tacky for 2 days at room temperature, latency sufficient for film adhesive applications. After curing at 65° C./3 hours, the $Tg_g$ was 109° C.

Example II.2

Test Sample 5 g EPON828 epoxy was mixed with 13.5 phr (PC/DEAPA).2TMP. The mixture remained flexible and tacky for 5–6 days at room temperature. The sample was gelled in one hour at 65° C. and cured 1 hour/80° C. giving a $Tg_g$ of 115° C.

Example II.3

Test Sample 0.7 g BDMA.DELA.TMP was mixed with 1.0 g TMP while warming the mixture on a hot plate. The product was a viscous, colorless liquid at room temperature. This was then mixed with 5 g EPON828 epoxy resin. The mixture was a milky white emulsion of medium viscosity at room temperature. The sample was placed in an oven at 65° C. After ten minutes the sample was clear, colorless and of medium viscosity. After one hour, the sample was a tacky semi-solid. After curing at 65° C. for 3 hours, the $Tg_g$ was 90° C. The cured material was very strong and tough and the absence of color suggests applications to optical adhesives.

Example II.4

Test Sample 5 g EPON828 epoxy was blended with 10 phr BHM-C.TMG and maintained at room temperature. After 5 days, the sample was a slightly flexible, tacky solid. Upon heating to 65° C., it melted to a viscous liquid and was cured for 2¾ hours at this temperature. The $Tg_g$ was 109° C.

Example II.5

Test Sample 5 g EPON828 epoxy was blended with 10 phr BHMC.TMG.TMP and cured 3½ hours at 65° C. The $Tg_g$ was 99° C. and the sample was very strong and tough.

Example II.6

Test Sample 5 g EPON828 epoxy was blended with a hardener mixture of 20 phr BPA/2BGE and 5 phr MPZ (1-methyl piperazine). After curing 1 hour at 65° C. the $Tg_g$ was 90° C. A second sample using 20 phr TDP/2BGE instead of BPA/2BGE gave identical results.

Example II.7

Test Sample 5 g EPON828 epoxy was blended with a hardener mixture containing 20 phr CAT/BGE, 5 phr BDMA and 4 phr DELA and left at room temperature. After 4 days, the mixture remained a viscous liquid, exhibiting excellent latency. After heating for 1½ hours at 50° C., the sample remained a very viscous liquid. After curing for 1 hour additional at 65° C., the sample was hard, tack-free, strong and gave a $Tg_g$ of 98° C.

Example III.1

Test Sample 5 g EPON828 epoxy was mixed with 3 phr Im.TMG and 5 phr TMP/BGE. The two hardener components were mixed before adding the epoxy. The mixture was gelled after one hour at 75° C. and cured at 120° C./1 hour. The $Tg_g$ was 153° C. The cured resin was very hard, strong and brittle.

Example III.2

Test Sample 5 g EPON828 epoxy was mixed with (10 phr BPA.2TMP +1.2 phr Im). After heating at 60° C./30 minutes followed by 80° C./30 minutes the sample was a rubbery solid (hot). After curing at 120° C. for 1 hour the $Tg_g$ was 137° C.

Example III.3

Test Sample 5 g EPON828 epoxy was mixed with (30 phr BPA.2TMP +1.2 phr Im). After heating at 50° C./1 hour followed by 80° C./1 hour, the sample was semi-solid (hot). After curing at 120° C./2 hours the $Tg_g$ was 86° C.

Example III.4

Test Sample

This sample was designed to have extended latency at room temperature for film adhesive applications with freezer storage and very long "out time" while providing complete curing at 120° C. and good properties of the cured resin. The basic concept is to utilize dicyandiamide (DICY) as the "amine" component of the hardener mixture in the form of a fine suspension in the epoxy resin, in which it is insoluble. DICY normally becomes active only at temperatures above 150° C. An additional hardener component is provided in the form of a mixture of polyols which are unreactive with the epoxy under storage conditions absent soluble DICY and which, when heated to 100–120° C. cause DICY to go into solution, followed by curing reactions of all of the components. It has been found that a mixture of ROL/2TMP and PC/DELA has the desired properties for the polyol solvent component of the hardener and that the correct proportions are: (ROL/2TMP).2(PC/DELA).2DICY.

As previously described, DICY is first milled into the epoxy resin and the polyol mixture, which is a liquid, is then added to the epoxy+DICY mixture at room temperature.

5 g EPON828 epoxy were blended with 5.9 phr DICY (insoluble powder) and a mixture of 12 phr ROL/2 TMP and 15.8 phr PC/DELA was then added. The mixture was an opaque, gray-green slurry. When heated to 107° C. for 15 minutes, there was no change, but when the temperature was increased to 120° C. the mixture abruptly cleared, turned amber and increased rapidly in viscosity. After curing at 120° C. for 1 hour, the $Tg_g$ was 104° C. The use of an epoxy of higher functionality than EPON828 epoxy would provide higher $Tg_q$ values.

Reaction Exotherm Characteristics

The three classes of epoxy hardeners described herein are molecular complexes consisting of combinations of amines and polyols as defined above. The polyol molecules are designed so that in most cases the most reactive (most acidic) hydroxyl groups are located at the ends of the molecule. Because of complex formation with amines, the amines are also located at the end points of the polyol molecules. Due to mutual catalysis, this results in rapid reaction of the hardener with the epoxy at lower temperatures than with conventional hardeners and a very rapid buildup of molecular weight of the polymer.

The low exotherm characteristics of these epoxy hardeners requires a more detailed explanation. If A is an amine and B is a polyol and A and B are mixed, an exothermic reaction occurs with the formation of a molecular complex:

$$A+B \rightarrow A.B + \Delta H$$

where ΔH represents the heat released by the reaction. If the complex A.B is then mixed with an epoxy E, the following sequence of reactions occurs:

$$A.B + E \rightarrow A/E + B/E + \Delta H' - \Delta H$$

where A/E and B/E represent the adducts of the amine-epoxy and polyol-epoxy, respectively, ΔH' is the heat released by the epoxy reactions, and ΔH is the heat of formation of the complex A.B. The overall heat released is thus reduced by the heat of formation of the complex A.B.

If, instead of forming the hardener complex A.B first, the polyol B is mixed with the epoxy and the amine A is then added in sequence, the following reactions occur:

$$(B+E)+A \rightarrow A.B + \Delta H + E \rightarrow A/E + B/E + \Delta H + \Delta H' - \Delta H \rightarrow A/E + B/E + \Delta H'$$

A comparison of the results for direct addition of the complex to the epoxy versus sequential addition of the hardener components to the epoxy, shows that the difference in heat released for these two cases is ΔH. Sequential addition of the hardener components thus results in a large heat release and a very short pot life or gel time. This is seldom an advantage except where a very fast cure of a small mass of material is desired.

For example, with one hardener system, a pot life of 30 minutes at 30° C. was obtained with a tack-free partial cure in one hour when the complex form of the hardener mixture was used. There was no noticeable exotherm. With sequential addition of the same hardener components, a tack-free partial cure was obtained in 15 minutes at 30° C. due largely to a considerable exotherm. In certain operations such as press molding where the cure rate is limited by the scorch temperature of the polymer, increased production rates can be obtained by the use of these hardener complexes.

Sequential addition of hardener components containing different polyols can result in unexpected exotherms. For example, ROL/2TMP is considerably more acidic than BPA. If ROL/2TMP is first mixed with the epoxy resin and BPA.2DETA is then added sequentially to the mixture, an exothermic reaction will occur with the formation of (ROL/2TMP).xDETA. As a rule, sequential addition of hardener components must be carefully considered.

It is generally understood in the chemical arts that trimethylolpropane (TMP) will react chemically with a primary amine in the presence of a catalyst and an elevated temperature. However, there is no information concerning the progress of this reaction at room temperature and in the absence of the catalyst. Since this question is of critical importance to the stability and effectiveness as epoxy hardeners of mixtures of TMP or TMP-derivatives and polyamines, a practical test was designed to answer this question. The test and the results are described below.

A hardener mixture consisting of a 1:1 molar ratio mixture of trimethylolpropane (TMP) and diethylenetriamine (DETA) was prepared. TMP and DETA were weighed into a small beaker and warmed slightly at 50–60° C. on a hot plate until the TMP was completely dissolved. Heat was given off as the TMP dissolved. There was only a barely detectable amine odor of the warm solution. As soon as the mixture had cooled to room temperature, a sample was prepared containing 5 g of Shell EPON828 epoxy and 21 phr of the hardener mixture. The sample was placed in an air-circulating oven at 30° C. and the physical properties of the sample recorded at 30 minute intervals as curing progressed. The remainder of the hardener sample was placed in a glass vial, tightly stoppered and stored at room temperature.

After 293 days at room temperature, the hardener sample was retrieved and a second epoxy sample was prepared which was identical to the first and cured under the same conditions. The results of the cure test were identical. It can be concluded that no substantial chemical change occurred in the hardener sample during the intervening period of storage at room temperature and most importantly, that there was no loss of effectiveness of the hardener mixture as a result of the prolonged storage at room temperature.

However, trimethylolpropane (TMP) does react with phenyl ring hydrogen and some of the polyols described herein contain phenyl groups. This reaction is catalyzed by either acid or base, including amines. For example, a mixture of resorcinol (ROL) and TMP reacts slowly at room temperature over a period of months without a catalyst to produce a partially substituted product ROL/xTMP. The reaction does not go to completion under these conditions. Other phenols and bisphenols also react similarly but at much lower rates.

Experiments utilizing the adducts of a number of phenols and bisphenols with TMP which were prepared using an appropriate catalyst at elevated temperature have shown that the adducts are superior to the phenols themselves as components of these epoxy hardeners. They are latent with epoxy absent a catalyst, they react more readily with epoxy at temperatures below 50° C. when properly catalyzed and the mechanical properties of the cured polymer are better, due perhaps to the more flexible terminal structure of the polyols. In these situations, it appears that, the phenolic hydroxyl groups do not react with the epoxy since TMP substitutes in the ortho position and the phenolic hydroxyls have poor availability as a result.

It is believed that a small amount of TMP or TMP-substituted material reacts with phenyl ring hydrogen during the cure of an epoxy at low temperature. Some of the $Tg_g$ values obtained after low temperature curing are unusually high if the properties are assumed to result from the consumption of epoxy groups only. If so, this constitutes an additional curing mechanism which may proceed concurrently with the epoxy reactions.

While a specific embodiment of the invention has been shown and described in detail to illustrate the application of the principles of the invention, it will be understood that the invention may be embodied otherwise without departing from such principles.

What is claimed is:

1. An epoxy hardener composition for mixing with an epoxy to cure the epoxy, the epoxy hardener consisting of:
   a polyol mixture comprising a first polyol having phenolic hydroxy groups, secondary alcohols and combinations thereof, and a second polyol having methylol functional groups, secondary alcohols and combinations thereof; and
   a component selected from the group consisting of mixtures of polyamines and tertiary amines, at least one tertiary amine, imidazole and dicyandiamide.

2. The epoxy hardener of claim 1, wherein the first polyol is selected from the group consisting of a dihydric phenol, adduct of a dihydric phenol with 1–2 moles of a monoglycidyl compound, adduct of a diglycidyl compound with 2 moles of a dihydric phenol, adduct of trimethylolpropane with 2 moles of a monoglycidyl compound, adduct of a 4-alkyl phenol with 1 mole diethanolamine and one mole formaldehyde, and adduct of a 4-alkyl phenol with 1 mole N,N(diethylamino)-3-propylamine and one mole formaldehyde.

3. The epoxy hardener of claim 2, wherein the second polyol is selected from the group consisting of trimethylolpropane, adducts of trimethylolpropane with 1 mole of a monoglycidyl compound, adduct of a dihydric phenol with 2 moles of trimethylolpropane (ring substitution), adduct of 0-cresyl glycidylether with 2 moles of trimethylolpropane (one ring substitution, one epoxy reaction), an adduct formed by first reacting trimethylolpropane with 2 moles of 0-cresyl glycidylether (removes epoxy groups) followed by reacting additional 2 moles of trimethylolpropane (ring substitution), adduct of a diglycidyl compound with 2,moles of a monohydric phenol capable of ring substitution, followed by reaction with 2 moles of trimethylolpropane, adduct of monoglycidyl compound with 1 mole of a monohydric phenol capable of ring substitution followed by reacting 1 mole of trimethylolpropane, and trihydric compound formed by reacting a 4-alkyl phenol with 2 moles of formaldehyde to produce methylol groups at the 2- and 6-positions.

4. The epoxy hardener according to claim 3, wherein the component is selected from the group consisting of a mixture of one of ethylenediamine, diethylenetriamine, triethylenetetramine and tetraethylenepentamine with a tertiary amine, at least one tertiary amine, imidazole and dicyandiamide.

5. The epoxy hardener composition according to claim 4, wherein the component is at least one tertiary amine.

6. The epoxy hardener composition according to claim 2, wherein the component is selected from the group consisting of a mixture of one of ethylenediamine, diethylenetriamine, triethylenetetramine and tetraethylenepentamine with a tertiary amine, at least one tertiary amine, imidazole and dicyandiamide.

7. The epoxy hardener composition according to claim 1, wherein, the second polyol is selected from the group consisting of trimethylolpropane, adducts of trimethylolpropane with 1 mole of a monoglycidyl compound, adduct of a dihydric phenol with 2 moles of trimethylolpropane (ring substitution), adduct of 0-cresyl glycidylether with 2 moles of trimethylolpropane (one ring substitution, one epoxy reaction), an adduct formed by first reacting trimethylolpropane with 2 moles of 0-cresyl glycidylether (removes epoxy groups) followed by reacting additional 2 moles of trimethylolpropane (ring substitution), adduct of a diglycidyl compound with 2 moles of a monohydric phenol capable of ring substitution, followed by reaction with 2 moles of trimethylolpropane, adduct of monoglycidyl compound with 1 mole of a monohydric phenol capable of ring substitution followed by reacting 1 mole of trimethylolpropane, and trihydric compound formed by reacting a 4-alkyl phenol with 2 moles of formaldehyde to produce methylol groups at the 2- and 6-positions.

8. The epoxy hardener composition according to claim 7, wherein the second polyol is trimethylolpropane.

9. An epoxy hardener composition according to claim 8, wherein the component is selected from the group consisting of a mixture of one of ethylenediamine, diethylenetriamine, triethylenetetramine and tetraethylenepentamine with a tertiary amine, at least one tertiary amine, imidazole and dicyandiamide.

10. The epoxy hardener composition according to claim 9, wherein the component is at least one tertiary amine.

11. The epoxy hardener composition according to claim 1, wherein the first polyol is selected from the group consisting of a bisphenol, adduct of a bisphenol with 1–2 moles of a monoglycidyl compound, and an adduct of a diglycidyl compound with 2 moles of a bisphenol.

12. The epoxy hardener of claim 11, wherein the second polyol is selected from the group consisting of trimethylolpropane, adducts of trimethylolpropane with 1 mole of a monoglycidyl compound, adduct of a dihydric phenol with 2 moles of trimethylolpropane (ring substitution), adduct of 0-cresyl glycidylether with 2 moles of trimethylolpropane (one ring substitution, one epoxy reaction), an adduct formed by first reacting trimethylolpropane with 2 moles of 0-cresyl glycidylether (removes epoxy groups) followed by reacting additional 2 moles of trimethylolpropane (ring substitution), adduct of a diglycidyl compound with 2 moles of a monohydric phenol capable of ring substitution, followed by reaction with 2 moles of trimethylolpropane, adduct of monoglycidyl compound with 1 mole of a monohydric phenol capable of ring substitution followed by reacting 1 mole of trimethylolpropane, and trihydric compound formed by reacting a 4-alkyl phenol with 2 moles of formaldehyde to produce methylol groups at the 2- and 6-positions.

13. An epoxy hardener composition for mixing with an epoxy to cure the epoxy, the epoxy hardener comprising:

a polyol mixture comprising a first polyol, wherein the first polyol is an adduct of a 4-alkyl phenol with 1 mole N,N(diethylamino)-3-propylamine and one mole formaldehyde, and a second polyol having methylol functional groups, secondary alcohols and combinations thereof; and a component selected from the group consisting of mixtures of polyamines and tertiary amines, at least one tertiary amine, imidazole and dicyandiamide.

14. The epoxy hardener composition according to claim 13, wherein, the second polyol is selected from the group consisting of trimethylolpropane, adducts of trimethylolpropane with 1 mole of a monoglycidyl compound, adduct of a dihydric phenol with 2 moles of trimethylolpropane (ring substitution), adduct of 0-cresyl glycidylether with 2 moles of trimethylolpropane (one ring substitution, one epoxy reaction), an adduct formed by first reacting trimethylolpropane with 2 moles of 0-cresyl glycidylether (removes epoxy groups) followed by reacting additional 2 moles of trimethylolpropane (ring substitution), adduct of a diglycidyl compound with 2 moles of a monohydric phenol capable of ring substitution, followed by reaction with 2 moles of trimethylolpropane, adduct of monoglycidyl compound with 1 mole of a monohydric phenol capable of ring substitution followed by reacting 1 mole of trimethylolpropane, and trihydric compound formed by reacting a 4-alkyl phenol with 2 moles of formaldehyde to produce methylol groups at the 2- and 6- positions.

15. The epoxy hardener composition according to claim 14, wherein the second polyol is trimethylolpropane.

16. An epoxy hardener composition according to claim 13, wherein the component is selected from the croup consisting of a mixture of one of ethylenediamine, diethylenetriamine, triethylenetetramine and tetraethylenepentamine and a tertiary amine, at least one tertiary amine, imidazole and dicyandiamide.

* * * * *